United States Patent
Braun et al.

(10) Patent No.: US 9,022,138 B2
(45) Date of Patent: May 5, 2015

(54) IMPACT DEVICE HAVING AN IMPACT MECHANISM LUBRICATING DEVICE

(75) Inventors: Helmut Braun, Bergkirchen (DE); Manfred Zinsmeister, Fürstenfeldbruck (DE)

(73) Assignee: Wacker Neuson Produktion GmbH & Co. KG, Munich (DE)

( * ) Notice: Subject to any disclaimer, the term of this patent is extended or adjusted under 35 U.S.C. 154(b) by 574 days.

(21) Appl. No.: 13/056,183

(22) PCT Filed: Jul. 17, 2009

(86) PCT No.: PCT/EP2009/005220
§ 371 (c)(1),
(2), (4) Date: Feb. 18, 2011

(87) PCT Pub. No.: WO2010/012390
PCT Pub. Date: Feb. 4, 2010

(65) Prior Publication Data
US 2011/0139475 A1 Jun. 16, 2011

(30) Foreign Application Priority Data

Jul. 28, 2008 (DE) .......................... 10 2008 035 084

(51) Int. Cl.
*E21B 3/00* (2006.01)
*E21B 17/22* (2006.01)
*E21B 19/16* (2006.01)
*E21B 19/18* (2006.01)
*F16N 11/08* (2006.01)
*B25D 9/10* (2006.01)
*B25D 17/26* (2006.01)

(52) U.S. Cl.
CPC *F16N 11/08* (2013.01); *B25D 9/10* (2013.01); *B25D 17/26* (2013.01); *B25D 2211/068* (2013.01); *B25D 2250/221* (2013.01)

(58) Field of Classification Search
CPC ................................ B23Q 11/121; B25D 9/10
USPC .................................. 173/213–222, 164–167
See application file for complete search history.

(56) References Cited

U.S. PATENT DOCUMENTS

| 2,121,706 | A | | 6/1938 | Little |
| 2,545,999 | A | | 3/1951 | Hirschberg |
| 3,642,077 | A | * | 2/1972 | Bayard .......................... 173/201 |
| 3,722,623 | A | * | 3/1973 | Waldecker ..................... 184/6.3 |
| 3,822,001 | A | * | 7/1974 | Sides .............................. 184/10 |
| 3,834,469 | A | * | 9/1974 | Uebel .............................. 173/75 |

(Continued)

FOREIGN PATENT DOCUMENTS

| DE | 622709 | | 5/1949 | |
| FR | 2833305 A1 | * | 6/2003 | .............. F02B 75/02 |

OTHER PUBLICATIONS

International Search Report for PCT/EP2009/005220, Dated Sep. 29, 2009.

*Primary Examiner* — Robert Long
(74) *Attorney, Agent, or Firm* — Boyle Fredrickson, S.C.

(57) ABSTRACT

The invention relates to an impact device, having an internal combustion engine and an impact mechanism driven by the internal combustion engine. An engine lubricating device supplies lubricant to the internal combustion engine. An impact mechanism lubricating device lubricates the impact mechanism accordingly. For this purpose, the engine lubricating device and the impact mechanism device partially comprise the same components.

14 Claims, 3 Drawing Sheets

(56) References Cited

U.S. PATENT DOCUMENTS

| | | | | |
|---|---|---|---|---|
| 4,483,072 | A | * | 11/1984 | Nagashima et al. ............ 30/381 |
| 4,493,623 | A | * | 1/1985 | Nelson ............................ 418/94 |
| 4,545,334 | A | * | 10/1985 | Nakagawa et al. ........ 123/41.33 |
| 4,636,147 | A | * | 1/1987 | Schweitzer et al. .......... 417/214 |
| 4,928,390 | A | * | 5/1990 | Gassen et al. ................ 30/123.4 |
| 5,060,761 | A | * | 10/1991 | Arndt et al. .................. 184/6.14 |
| 5,154,585 | A | * | 10/1992 | Spencer ........................ 417/364 |
| 5,267,537 | A | * | 12/1993 | Suzuki et al. .............. 123/90.38 |
| 5,332,064 | A | * | 7/1994 | Liu ................................ 184/6.4 |
| 5,653,028 | A | * | 8/1997 | Hashimoto .................. 30/123.4 |
| 5,826,556 | A | * | 10/1998 | Ruman et al. ............ 123/196 W |
| 5,829,395 | A | * | 11/1998 | Brenny et al. ............ 123/73 AD |
| 5,941,210 | A | * | 8/1999 | Hill et al. ...................... 123/305 |
| 6,216,651 | B1 | * | 4/2001 | Ishikawa et al. ......... 123/73 AD |
| 6,390,034 | B1 | * | 5/2002 | Orzal et al. .............. 123/73 AD |
| 6,436,021 | B2 | * | 8/2002 | Nukui ................................ 483/1 |
| 6,536,634 | B2 | * | 3/2003 | Berndorfer et al. ............ 222/442 |
| 6,758,632 | B2 | * | 7/2004 | Hausler et al. ............. 404/133.1 |
| 6,932,046 | B2 | * | 8/2005 | Hausler et al. ............. 123/196 R |
| 7,004,130 | B2 | * | 2/2006 | Bolz et al. .................. 123/90.17 |
| 7,431,006 | B2 | * | 10/2008 | Jankuski .................... 123/196 R |
| 8,047,302 | B2 | * | 11/2011 | Berger et al. ...................... 173/1 |
| 8,065,986 | B2 | * | 11/2011 | Sachdev et al. ........... 123/196 R |
| 8,127,725 | B2 | * | 3/2012 | Crowe et al. .............. 123/90.15 |
| 2005/0034881 | A1 | * | 2/2005 | Berger et al. ...................... 173/2 |
| 2006/0000206 | A1 | * | 1/2006 | Stoudt ............................. 60/407 |
| 2008/0282557 | A1 | * | 11/2008 | Kaiser et al. ..................... 30/392 |
| 2009/0000592 | A1 | * | 1/2009 | Luft et al. ................. 123/196 R |

* cited by examiner

IMPACT DEVICE HAVING AN IMPACT MECHANISM LUBRICATING DEVICE

BACKGROUND OF THE INVENTION

1. Field of the Invention

The invention relates to an impact device having an internal combustion engine, an impact mechanism driven by the internal combustion engine, an engine lubricating device for storing and supplying lubricant for the internal combustion engine, and having an impact mechanism lubricating device for storing and supplying lubricant for the impact mechanism.

2. Discussion of the Related Art

Impact devices, for example gasoline-operated hammer breakers, are known. An impact device of this type has an internal combustion engine which drives an impact mechanism which can be used to act upon a tool, for example a chisel. In this case, in addition to a lubricating device for the internal combustion engine, the impact device has a further lubricating system for the impact mechanism. The impact mechanism lubricating systems may differ in design. Thus, systems for non-circulating lubrication are known in which lubricant is consumed. There are also sealed systems which are filled once with a lubricant which suffices for the service life of the impact mechanism or for a maintenance period. Impact mechanisms may be lubricated, for example, with grease, but also by oil lubrication.

Furthermore, a lubricating system for lubrication where necessary is known, for example, from WO 03/053639 A1.

Systems for non-circulating lubrication in metered form or where necessary require an increased structural outlay. By contrast, in impact mechanisms which are not supplied by non-circulating lubrication but rather by lubrication having a sealed system, an increased outlay is required for sealing the housing. In addition, regular maintenance has to be carried out in order to change the seals and the consumed lubricant.

SUMMARY OF THE INVENTION

The invention is based on the object of providing non-circulating lubricant where necessary or in metered form for an impact mechanism with a minimal additional structural outlay.

The object is achieved by providing an impact device having an internal combustion engine, an impact mechanism driven by the internal combustion engine, an engine lubricating device for storing and supplying lubricant for the internal combustion engine, and an impact mechanism lubricating device for storing and supplying lubricant for the impact mechanism is characterized in that the engine lubricating device and the impact mechanism lubricating device at least partially have the same components.

This enables the two lubricating devices to be partially identical and to at least partially use the same components. In other words, this means that a lubricating system is provided which supplies both the internal combustion engine and the impact mechanism with lubricant. In particular, the lubricating device of the internal combustion engine can thereby additionally also be used to lubricate the impact mechanism. An independent lubricating device for the impact mechanism is then no longer required. One and the same system can thereby serve to lubricate the engine and the impact mechanism. The quantities conveyed are in each case so small that the conveying of all of the lubricant, in particular if the lubricant is oil, does not constitute any problem.

The components which can be jointly used here are in particular a storage container (tank) for storing the lubricant, the lubricant itself, a conveying device for conveying the lubricant, a drive for the conveying device, and a lubricant guide for guiding and conducting the lubricant. Depending on the configuration of the lubricating system, said components have to be provided only once in the impact device and can then be used both for lubricating the engine and the impact mechanism.

The conveying device may have a pump. The conveying device may also bring about conveying with the assistance of gravity, spring pretensioning (spring-pretensioned piston), etc.

The impact mechanism may be provided very simply with non-circulating lubrication where necessary by the separate lubrication of the internal combustion engine, which lubrication is customarily already present, also supplying the impact mechanism with lubricant. A complicated sealing of the impact mechanism can thereby also be dispensed with. In particular, components which move at a high speed relative to one another, such as, for example, an impact piston or a punch-type dolly, do not have to be sealed off from one another. Accordingly, it is not possible for any problems due to wear of the seals to occur.

It is possible for oil serving as the lubricant to in each case trickle into the impact mechanism from above only in small quantities, and therefore only precisely the quantity of oil required for lubricating the components is always located in the impact mechanism. As a result, the impact mechanism does not have to be sealed off downward.

It should be noted in this case that impact devices of this type are frequently used for operation downward, for example for breaking up a concrete foundation or a road topping. As a result, the impact device, i.e., for example, a gasoline-operated hammer breaker, is generally located in a vertical operating position in which it operates downward. Dirt and abrasion can be conveyed downward out of the impact mechanism by the oil in the direction of a shank end for the tool. The shank end is thereby lubricated at the same time.

Over greasing of the impact mechanism is not possible since excessive oil, i.e. oil not adhering to the components of the impact mechanism, is immediately let out downward because it cannot be retained by any seals.

Owing to the fact that the impact mechanism is constantly supplied with fresh oil, maintenance is not required. In addition, oil facilitates rapid cold starting at low temperatures at which grease, by contrast, has proven very viscous and rather a nuisance.

Since the oil of the internal combustion engine is used at the same time to lubricate the impact mechanism, a lack of oil can also be identified in good time, since an oil level display is customarily already present in the tank.

In addition, there is the option of a control device switching off the device if there is a lack of oil. An additional stock of lubricant for lubricating the impact tool is not required.

The engine lubricating device and the impact mechanism lubricating device can have a common conveying device, wherein a distributing device is provided downstream of the conveying device, for supplying lubricant to the impact mechanism and/or to the internal combustion engine. In this version, the common conveying device, i.e., for example, a common pump, is therefore used to supply both the impact mechanism and the internal combustion engine with lubricant.

The distributing device can have a mass flow divider for continuously distributing the stream of lubricant conveyed by the conveying device, and/or a shuttle device for distributing a stream of lubricant conveyed by the conveying device either to the internal combustion engine or to the impact mechanism. The mass flow divider therefore divides the stream of lubricant in a certain predetermined or else variable ratio such that lubricant passes at the same time to the internal combustion engine and to the impact mechanism. By contrast, with the shuttle device, the stream of lubricant is guided alternately exclusively to the internal combustion engine or to the impact mechanism. The quantitative ratio can be adjusted by the period of time taken for the respective supply. It will be required in practice for the internal combustion engine to predominantly receive lubricant whereas lubricant is supplied only occasionally, for example at certain time intervals, to the impact mechanism.

In one embodiment, the engine lubricating device and the impact mechanism lubricating device can each have a dedicated storage container for storing lubricant. This may be necessary in particular whenever the engine requires a different lubricant from the impact mechanism. However, even in this case, a common conveying device can be provided, wherein a shuttle device is arranged between the two storage containers and the common conveying device, for connecting the conveying device alternately to one of the storage containers. In this manner, for example, the pump can be connected alternately to one and then to the other storage container.

A further shuttle device can then be arranged downstream of the common conveying device and upstream of the internal combustion engine and the impact mechanism in order to convey the lubricant removed in each case from one of the storage containers to the desired target.

In this case, the two shuttle devices can be switched in a coordinated manner such that the lubricant from the storage container of the engine lubricating device can be guided to the internal combustion engine, and the lubricant from the storage container of the impact mechanism lubricating device can be guided to the impact mechanism. The shuttle devices are accordingly switched simultaneously in order in each case to realize individual streams of lubricant for the engine and the impact mechanism. However, the common conveying device is used equally in both cases.

The shuttle device or optionally both shuttle devices can be activated as a function of different parameters. For example, the shuttle device can be controlled by time or as a function of a temperature (engine temperature, impact mechanism temperature or a different meaningful temperature). It is likewise possible to use an engine load, a rotational speed of the engine or a position of a throttle valve in the internal combustion engine as a criterion. A force applied to the impact device by the operator may also be used as relevant criterion, which force can be detected in a suitable manner by a force detector, for example on the handle of the impact device.

In one embodiment, the engine lubricating device and the impact mechanism lubricating device can have a common storage container, wherein the engine lubricating device and the impact mechanism lubricating device each use a dedicated conveying device. The respectively dedicated conveying device in turn can be provided with a dedicated drive. As an alternative, a common drive can also drive both conveying devices.

The power of the conveying device can be controlled as a function of a load of the internal combustion engine. As a result, the quantity of lubricant can be adjusted where necessary as a function of the actual loading of the engine. Since it should be assumed that, if the engine loading is increased, the impact mechanism is also subjected to increased loading, the impact mechanism can therefore also be lubricated where necessary.

The conveying device can be driven by a dedicated drive or by the internal combustion engine.

The oil for the internal combustion engine can be conveyed where necessary, for example as a function of the power, such that the impact mechanism is then also automatically supplied where necessary with oil, specifically as a function of the respective operating state.

In this manner, non-circulating lubricant can be provided very simply where necessary for an impact mechanism, with the separate lubrication of the engine also supplying the impact mechanism at the same time.

The impact mechanism can have a gear mechanism which serves to convert a rotational movement of the internal combustion engine into an axially reciprocating movement, wherein the gear mechanism is lubricated by the impact mechanism lubricating device. A gear mechanism of this type is known and may comprise, for example, a crank drive with which a driving piston belonging to the impact mechanism is driven, the reciprocating movement of which driving piston is transmitted in turn to an impact piston. This driving principle is used in particular for pneumatic spring impact mechanisms.

As stated above, the gear mechanism may be lubricated at the same time by the impact mechanism lubricating device. However, it is also possible to provide the gear mechanism with dedicated lubrication, for example grease lubrication, which is independent of the impact mechanism lubricating device.

The internal combustion engine may be a two-stroke or a four-stroke engine. As emerges from the above, the engine lubricating device which is already present is used to additionally also supply the impact mechanism with lubricant.

The impact device may have a tool holder into which a tool which can be acted upon by the impact mechanism can be inserted. Given a suitable design of the impact mechanism and of the lubricating device for the impact mechanism, it is possible also to supply the tool holder, in particular a shank end provided therefore, with lubricant.

These and further advantages and features of the invention are explained in more detail below with reference to examples and with the assistance of the accompanying figures, in which:

DETAILED DESCRIPTION OF THE PREFERRED EMBODIMENT

Figure 1:
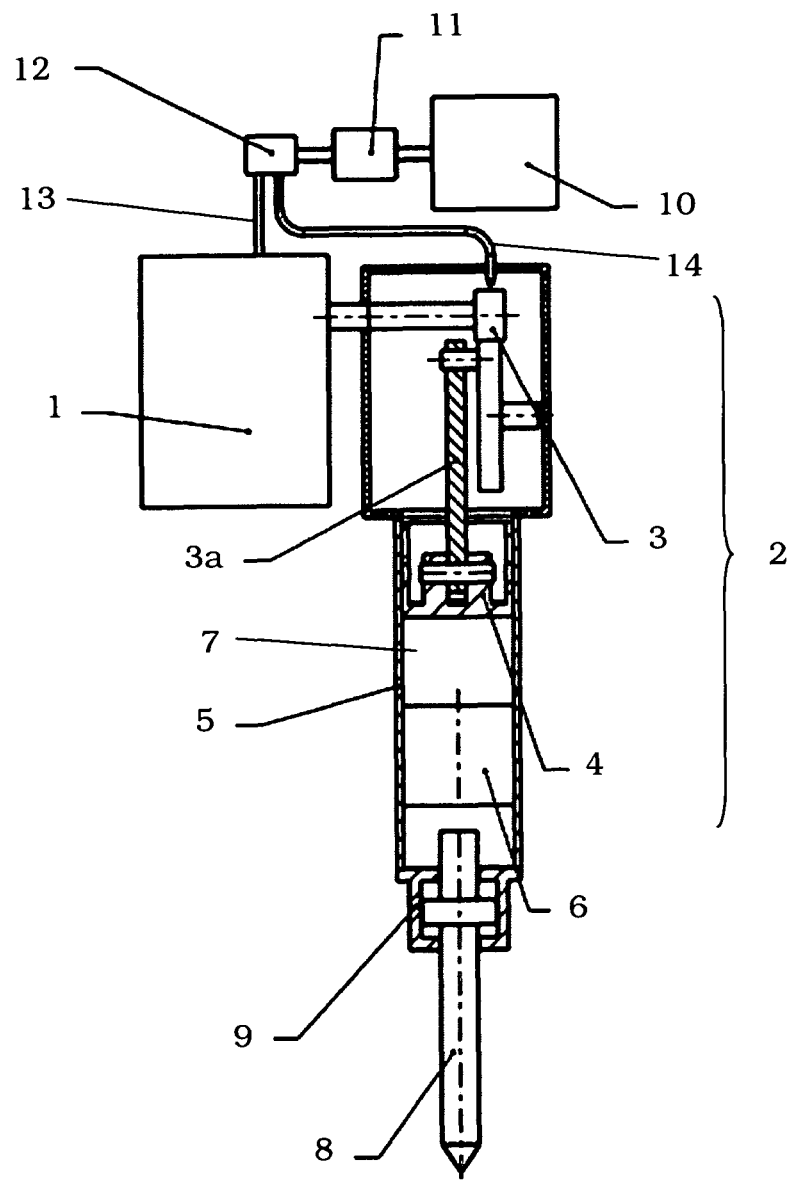
FIG. 1 shows a schematic side view of an impact device.

FIG. 1 shows, in a schematic side view, an impact device in the form of a gasoline-operated hammer with common lubrication of the impact mechanism and two-stroke engine.

An engine 1 designed as a two-stroke internal combustion engine drives a driving piston 4 to and fro via a gear mechanism 3 belonging to an impact mechanism 2 and via a crank drive with a connecting rod 3a. In front of the driving piston 4, an impact piston 6 is likewise moveable to and fro axially in a guide cylinder 5. As a result of the fact that a pneumatic spring 7 is formed between the driving piston 4 and the impact piston 6, the movement of the driving piston 4 is transmitted with a time delay to the impact piston 6 which can then move freely in the direction of the end of a tool 8 embodied in the form of a chisel. The tool 8 is held in a tool holder 9. The impact piston 6 strikes against the shank end of the tool 8 and thus generates the desired operating action.

Said "pneumatic spring impact mechanism" (identified in summary by reference number 2) is known and has long proven successful in practice. However, other types of impact mechanisms, in which the lubricating system under discussion here can be used, are readily also known or conceivable.

The lubricating system has an oil tank 10 serving as a storage container for storing oil. The oil is conveyed out of the oil tank 10 by a pump 11 serving as a conveying device.

A distributor 12 serving as a distributing device is provided downstream of the pump 11, and therefore the oil is guided to the engine 1 via a line 13 serving as a lubricant guide and to the impact mechanism 2 via a line 14 likewise serving as a lubricant guide.

The engine 1 can thereby be lubricated in a tried and tested manner known per se. In addition, however, the lubricating system which already exists for separate lubrication of the engine 1 is used to also lubricate the impact mechanism 2.

The gear mechanism 3 which is lubricated with oil directly via the line 14 is also already considered here to be part of the impact mechanism 2. The oil can thus drip out of the line 14 and pass directly onto the gear wheels of the gear mechanism 3. When the impact device shown in FIG. 1 is held vertically during operation, the oil which then drips downward passes further downward into the region of the driving piston 4 and onto the impact piston 6 and finally to the tool holder 9 where the shank end of the tool 8 is also lubricated.

The distributor 12 may be in the form of a mass divider in which oil is continuously guided simultaneously to the engine 1 via the line 13 and to the gear mechanism 2 via the line 14. In this case, it is possible for any mass ratios to be set to be constant or else variable.

As an alternative thereto, the distributor 12 may also have a shuttle valve which switches intermittently to and fro between the lines 13 and 14. The shuttle valve may be, for example, time-controlled and/or activated by states, such as temperature, load, rotational speed, operating force, throttle valve position or the like.

Figure 2:
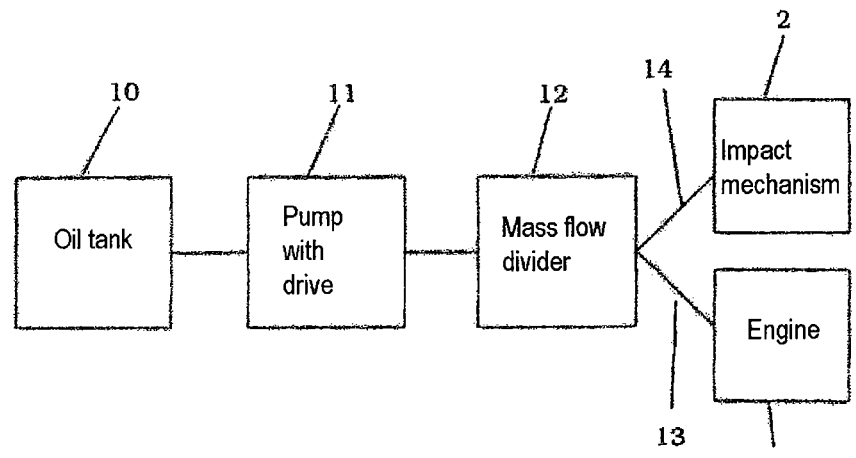
FIG. 2 shows a block diagram with the active principle for lubricating the impact mechanism from FIG. 1.
Figure 3:
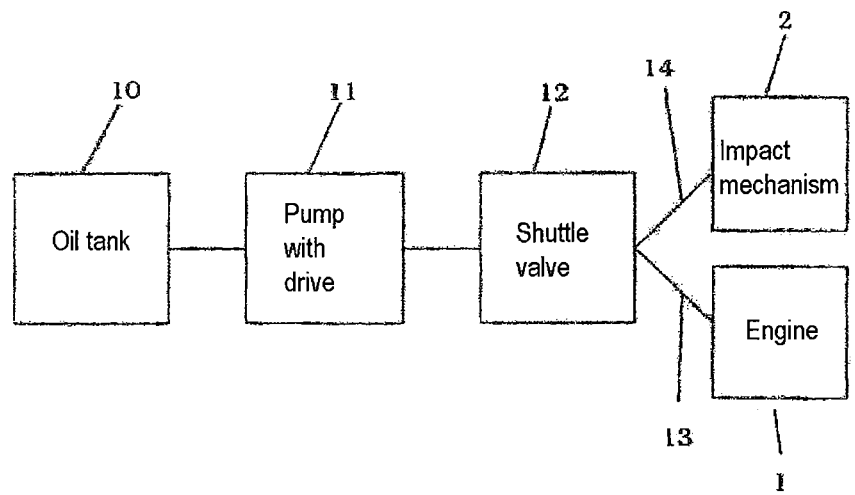
FIG. 3 shows a block diagram with a different active principle.

FIGS. 2 and 3 show the two alternatives in the form of two block diagrams in which the distributor 12 is indicated either as a mass flow divider or shuttle valve. It is apparent therefrom that the engine lubricating device and the impact mechanism lubricating device largely use the same components. The stream of lubricant is divided only after the distributor 12.

Figure 4:
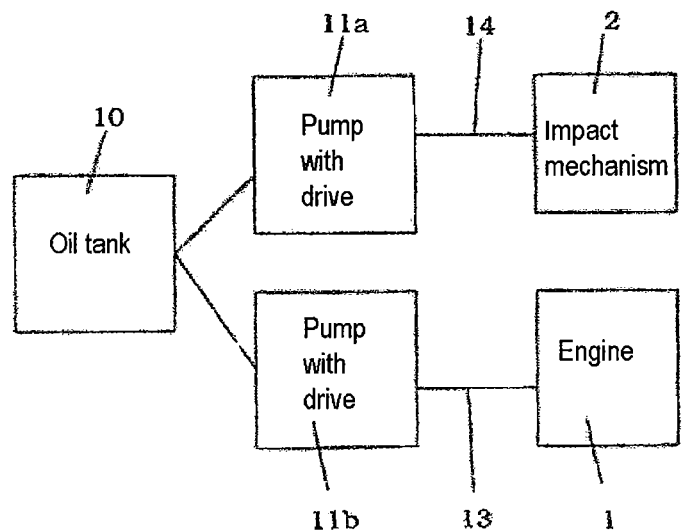
FIG. 4 shows a block diagram with yet another active principle.

FIG. 4 shows a version in which two pumps 11a and 11b are provided, the pumps each drawing oil out of the common oil tank 10 and respectively supplying said oil to the impact mechanism 2 and to the engine 1.

In this case, only the oil tank 10 is made dual use of. However, joint use may be made of the drive of the pumps 11a and 11b. As an alternative, each of the pumps 11a, 11b may also be driven separately.

Figure 5:
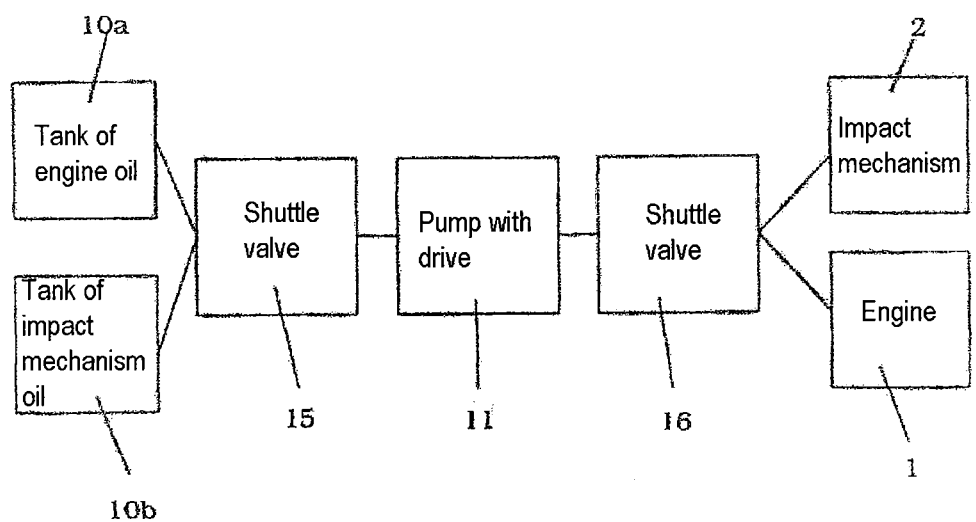
FIG. 5 shows a block diagram with a further lubricating system.

FIG. 5 shows an embodiment in which a tank 10a is provided for the lubricant used for the engine 1, namely engine oil, and a tank 10b is provided for the impact mechanism oil serving as lubricant for the impact mechanism. This situation may be expedient whenever the impact mechanism 2 and the engine 1 each have to be supplied with a special oil. A shuttle valve 15 is provided downstream of the tanks 10a and 10b and switches to and fro in an alternating manner between the tanks 10a and 10b. Furthermore, a common pump 11 and a shuttle valve 16 are provided.

By means of suitable activation of the shuttle valves 15 and 16, it is possible optionally to convey engine oil out of the tank 10a to the engine 1 and impact mechanism oil out of the tank 10b to the impact mechanism 2. In this case, joint use is made of the two shuttle valves 15, 16 and of the pump 11. The lines in the jointly used region may have to be emptied between the switching over operation.

The oil tanks 10 or 10a and 10b which store the lubricant may be provided with a level display such that a lack of oil is indicated in good time. There is also the possibility of switching off the impact device in good time if there is a lack of oil.

We claim:

1. An impact device, comprising:
   an internal combustion engine;
   a reciprocating impact mechanism for driving a tool linearly, the impact mechanism being reciprocated by and external to the internal combustion engine;
   an engine lubricating device including an oil pump for storing and supplying lubricant for the internal combustion engine;
   an impact mechanism lubricating device for storing and supplying lubricant for the impact mechanism; wherein
   the engine lubricating device and the impact mechanism lubricating device share a same storage container for storing a shared lubricant, wherein
   the engine lubricating device and the impact mechanism lubricating device each have a dedicated conveying device that is fluidically separated from the conveying device of the other of the engine lubricating device and the impact mechanism lubricating device; and wherein
   the internal combustion engine and the impact mechanism each have a separate housing preventing a mixing of lubricant within the housings.

2. The impact device as recited in claim 1, wherein the engine lubricating device and the impact mechanism lubricating device also share at least one of:
   a conveying device for conveying a lubricant;
   a drive for the conveying device; and
   a lubricant guide for guiding and conducting the lubricant.

3. The impact device as recited in claim 1, wherein
   the engine lubricating device and the impact mechanism lubricating device have a common conveying device; and wherein
   a distributing device is provided downstream of the conveying device for supplying lubricant to at least one of the impact mechanism and the internal combustion engine.

4. The impact device as recited in claim 3, wherein the distributing device has at least one of i) a mass flow divider for continuously distributing a stream of lubricant conveyed by the conveying device, and ii) a shuttle device for distributing a stream of lubricant conveyed by the conveying device either to the internal combustion engine or to the impact mechanism.

5. The impact device as recited in claim 1, wherein
   the engine lubricating device and the impact mechanism lubricating device each have a dedicated pump for conveying lubricant;
   a shuttle device is arranged between the storage containers and the common conveying device for connecting the conveying device alternately to one of the storage containers; and wherein a further shuttle device is arranged downstream of the common conveying device and upstream of the internal combustion engine and the impact mechanism.

6. The impact device as recited in claim 5, wherein the two shuttle devices can be switched in a coordinated manner such that the lubricant from the storage container of the engine lubricating device can be guided to the internal combustion engine, and such that the lubricant from the storage container of the impact mechanism lubricating device can be guided to the impact mechanism.

7. The impact device as recited in claim 5, wherein the shuttle device can be activated as a function of at least one of:
    a time;
    a temperature;
    an engine load;
    a rotational speed of the internal combustion engine;
    a force applied to the impact device by an operator; and
    a position of a throttle valve in the internal combustion engine.

8. The impact device as recited in claim 3, wherein the power of the conveying device can be controlled as a function of a load of the internal combustion engine.

9. The impact device as recited in claim 3, wherein the conveying device can be driven by at least one of a dedicated drive and the internal combustion engine.

10. The impact device as recited in claim 1, wherein
    the impact mechanism has a gear mechanism for converting a rotational movement of the internal combustion engine into an axial reciprocating movement; and wherein
    the impact mechanism lubricating device serves to lubricate the gear mechanism.

11. The impact device as recited in claim 1, wherein the internal combustion engine is one of a two-stroke engine and a four-stroke engine.

12. The impact device as recited in claim 1, further comprising a tool holder into which a tool which can be acted upon by the impact mechanism can be inserted.

13. An impact device, comprising:
    a four-stroke internal combustion engine;
    a reciprocating impact mechanism for driving a tool linearly, the impact mechanism being reciprocated by and external to the internal combustion engine;
    an engine lubricating device including an oil pump that stores lubricant and supplies lubricant to the internal combustion engine;
    an impact mechanism lubricating device that stores lubricant and that supplies lubricant to the impact mechanism; wherein
    the engine lubricating device and the impact mechanism lubricating device share a same storage container for storing a shared lubricant, wherein
    the engine lubricating device and the impact mechanism lubricating device each have a dedicated conveying device that is fluidically separated from the conveying device of the other of the engine lubricating device and the impact mechanism lubricating device; and wherein
    the internal combustion engine and the impact mechanism each have a separate housing preventing a mixing of lubricant within the housings.

14. The impact device as recited in claim 13, wherein the shared component includes at least one of:
    a conveying device for conveying a lubricant;
    a drive for the conveying device; and
    a lubricant guide for guiding and conducting a lubricant.

* * * * *